United States Patent [19]

Miller et al.

[11] 3,981,968
[45] Sept. 21, 1976

[54] SOLVENT EXTRACTION OF NICKEL FROM AMMONIACAL SOLUTIONS

[75] Inventors: David J. Miller, Gretna; Tadeusz K. Wiewiorowski, New Orleans, both of La.

[73] Assignee: Freeport Minerals Company, New York, N.Y.

[22] Filed: July 11, 1974

[21] Appl. No.: 487,560

Related U.S. Application Data

[63] Continuation-in-part of Ser. No. 407,925, Oct. 19, 1973, abandoned.

[52] U.S. Cl. .............................. 423/139; 75/101 BE
[51] Int. Cl.[2] .................. C01G 51/10; C01G 53/00
[58] Field of Search ......... 423/139; 75/119, 101 BE

[56] References Cited
UNITED STATES PATENTS

| | | | |
|---|---|---|---|
| 3,224,873 | 12/1965 | Swanson | 75/101 BE |
| 3,743,585 | 7/1973 | Lowenhaupt et al. | 75/119 X |
| 3,752,745 | 8/1973 | Kane et al. | 75/101 BE |
| 3,761,249 | 9/1973 | Ritcey et al. | 75/119 |
| 3,849,534 | 11/1974 | Skarbo | 423/139 |
| 3,867,506 | 2/1975 | Skarbo et al. | 423/139 |

OTHER PUBLICATIONS

*Solvent Extraction,* Proceedings of the I.S.E.C., Society of Chemical Industry, London 1971 pp. D93, D95, D96.
Evans et al, Editors "International Symposium on Hydrometallurgy," Chicago, Ill. 2/25 to 3/1/73; A.I.M.M.E. Inc. New York 1973, pp. 559,562,563,571,572,575.

*Primary Examiner*—Oscar R. Vertiz
*Assistant Examiner*—Brian E. Hearn
*Attorney, Agent, or Firm*—Ronald A. Schapira

[57] ABSTRACT

An ammoniacal solution containing nickel and cobalt is contacted with an extractant comprising an oxime or oxine compound dissolved in an organic diluent to selectively extract the nickel into the organic phase while leaving most of the cobalt in the aqueous ammoniacal phase from which it is subsequently recovered. The nickel-loaded organic extract is washed with water and aqueous carbon dioxide to remove and recover ammonia which undesirably transfers to the organic phase during the extraction. The ammonia-free, nickel-loaded extract is then stripped with aqueous sulfuric acid at low temperature to remove the nickel. The ammonia-free nickel sulfate solution produced in the stripping operation is particularly suitable for recovering the nickel by electrolytic deposition. The stripped organic extract is further stripped with aqueous sulfuric acid at high temperature to remove and recover the small amount of cobalt which transfers to the organic phase during extraction and hampers reuse of the organic extractant in the process. Removal of the cobalt permits recycle of the extractant to the process.

22 Claims, 1 Drawing Figure

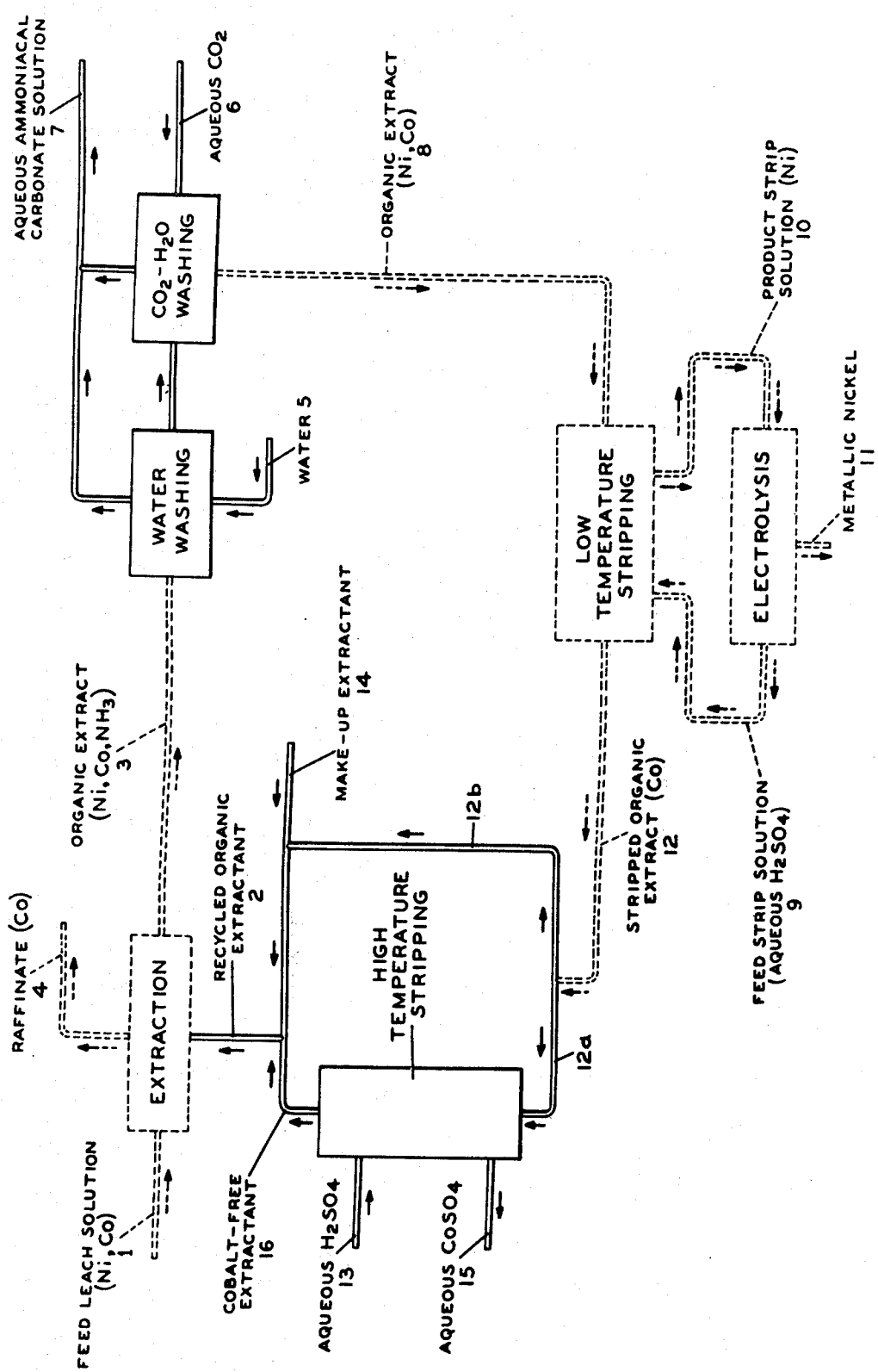

SOLVENT EXTRACTION OF NICKEL FROM AMMONIACAL SOLUTIONS

CROSS REFERENCE TO RELATED APPLICATIONS

This is a continuation-in-part of application Ser. No. 407,925 filed Oct. 19, 1973 now abandoned in favor of the present application.

BACKGROUND OF THE INVENTION

This invention relates to the recovery of nickel and cobalt from ammoniacal solutions containing these metals and, in particular, to the recovery of nickel and cobalt from such solutions by solvent extraction techniques.

Numerous nickel and cobalt-enriched ammoniacal solutions are known to those skilled in the art. For example, ammoniacal carbonate solutions containing nickel and cobalt are produced commercially by heating cobalt-containing nickeliferous ores in a furnace with a reductant gas and then leaching the reduced ores in the presence of oxygen with an aqueous solution of ammonium hydroxide and ammonium carbonate. Examples of the production of such solutions are described in U.S. Pat. Nos. 1,487,145 and 3,100,700, and in "The Winning of Nickel," J. R. Boldt, Jr., Van Nostrand Co., Inc., Princeton, N.J., 1967, pp. 425–537.

Ammoniacal chloride solutions containing nickel and cobalt are prepared by leaching reduced lateritic ores with an aqueous leach liquor containing ammonium hydroxide and ammonium chloride. Ammoniacal chloride solutions are also prepared by dissolving or redissolving a nickel and cobalt-containing material such as a nickel matte, a basic nickel carbonate, mixtures of nickel carbonates and cobalt carbonates, a nickel oxide, nickel scrap, a nickel alloy or mixtures of nickel sulfide and cobalt sulfide containing nickel and cobalt in varying proportions, in an aqueous solution of ammonium hydroxide and ammonium chloride, or in aqueous hydrochloric acid followed by adjustment of the solution pH to above 7 and normally above 8, with ammonia.

Ammoniacal nitrate solutions containing nickel and cobalt are prepared by leaching reduced lateritic ores with an aqueous leach liquor containing ammonium hydroxide and ammonium nitrate. Ammoniacal nitrate solutions are also prepared by dissolving or redissolving a nickel and cobalt-containing material such as nickel matte, a basic nickel carbonate, mixtures of nickel carbonates and cobalt carbonates, a nickel oxide, a nickel alloy, nickel scrap, mixtures of nickel sulfide and cobalt sulfide containing nickel and cobalt in varying proportions, in an aqueous solution of ammonium hydroxide and ammonium nitrate, or in aqueous nitric acid followed by adjustment of the solution pH to above 7, and normally above 8, with ammonia.

Ammoniacal sulfate solutions containing nickel and cobalt are prepared by leaching reduced lateritic ores with an aqueous leach liquor containing ammonium hydroxide and ammonium sulfate. Ammoniacal sulfate solutions are also prepared by dissolving or redissolving a nickel and cobalt-containing material such as a nickel matte, a basic nickel carbonate, mixtures of nickel carbonates and cobalt carbonates, a nickel oxide, a nickel alloy, nickel scrap, mixtures of nickel sulfide and cobalt sulfide containing nickel and cobalt in varying proportions, in an aqueous solution of ammonium hydroxide and ammonium sulfate, or in aqueous sulfuric acid followed by adjustment of the solution pH to above 7, and normally above 8, with ammonia.

Numerous techniques have been developed to separate and recover the nickel and cobalt values from these solutions in a convenient form. One such technique involves the extraction of the solutions with various oxime and oxine compounds (of the type disclosed, for example, in U.S. Pat. Nos. 3,276,863, 3,592,775, 3,655,347 and 3,725,046) dissolved in an organic diluent in order to selectively extract the nickel into the organic phase and leave the cobalt in the aqueous ammoniacal phase.

The application of this technique specifically to the recovery of nickel and cobalt from ammoniacal solutions is described for the case of oxime compounds in U.S. Pat. No. 3,276,863. In this patent, a synthetic ammoniacal solution containing nickel and cobalt is contacted with air or another oxidizing agent and then extracted with the oxime extractant which selectively extracts the nickel. The nickel-loaded extract is stripped with a solution of a strong acid or ammonia, or other aqueous solutions capable of causing the nickel to transfer out of the extract, to recover the nickel and regenerate the organic extractant.

One aspect of the present invention involves an improvement of the process described in U.S. Pat. 3,276,863 applicable when the nickel-loaded extractant is stripped with aqueous sulfuric acid. Such may be the case, for example, when an object of the process is the manufacture of an electrolytic solution suitable for the production of high purity electrolytic nickel. When sulfuric acid is used as the stripping agent, several problems can arise in the solvent extraction technique described in U.S. Pat. No. 3,276,863. For example, during extraction with the oxime extractant some ammonia is transferred from the aqueous ammoniacal leach solution to the organic phase. Even though most of the ammonia remains in the aqueous phase during extraction and is eventually recovered for reuse in the process, the small amounts that do transfer to the organic phase represent a loss of ammonia since they normally are not recovered. More importantly, these small amounts of ammonia can react with the sulfuric acid in the stripping operation, and by neutralizing some of it, cause the acid to lose some of its stripping power. The ammonia also frequently forms compounds which can interfere with subsequent processing of the product strip solution. For example, the presence of ammonia in a nickel-loaded extract can cause the formation of compounds such as $(NH_4)_2SO_4$ and $(NiNH_4)_2(SO_4)_3$ in the nickel-loaded strip solution when the extract is stripped with sulfuric acid. These compounds not only consume some of the stripping agent, but their presence can also interfere with the subsequent electrolysis of the product strip solution. The double salt $(NiNH_4)_2(SO_4)_3$, for example, precipitates and is deposited with the metallic nickel causing a purity problem and a decrease in the amount of metallic nickel recovered in the process.

A second aspect of the invention overcomes other problems associated with the process described in U.S. Pat. 3,276,863 which arise from the transfer of cobalt into the organic extractant during the extraction step. This cobalt tends to eventually load the recycled organic extractant with cobalt after a few passes in the circuit. This is generally known in the art as "cobalt poisoning of the organic". This "poisoning" presents a problem because for each gram of cobalt present in the recycled organic extractant, an equivalent one gram of nickel in the feed ammoniacal leach solution remains unextracted. Thus to maintain a practical extraction efficiency, the cobalt-poisoned organic must be bled from the system in order to maintain a low cobalt concentration in the recycled extractant. The bleeding of poisoned extractant represents not only a loss of valuable cobalt and expensive extractant, but also creates a waste disposal problem since the extractant may not be sent to waste with other waste streams because of pollution considerations and therefore has to be impounded.

It is a general object of the present invention to provide methods for overcoming the above mentioned problems associated with prior art solvent extraction processes for recovering nickel from ammoniacal solutions containing nickel and cobalt.

It is a more specific object of the invention to provide a method for removing ammonia from the extractant used in these prior art solvent extraction processes, in cases where the nickel is stripped from the extractant by aqueous sulfuric acid, before the stripping operation takes place so that the ammonia is not available to react with the acid to create an ammonia loss and unwanted contaminants in the acid strip solution.

It is another object of the invention to provide in such prior art solvent extraction processes a method for reducing the sulfate impurities normally found in the nickel-loaded strip solution in the case where the extractant is stripped with aqueous sulfuric acid, so that the strip solution becomes more suitable for use in the production of high purity electrolytic nickel.

It is another specific object of the invention to provide in such prior art solvent extraction processes a method for removing from the extractant a sufficient quantity of the cobalt transferred to the extractant during the extraction step to eliminate "cobalt poisoning" of the extractant, so that the extractant can be recycled to the process.

It is another object of the invention to provide in such prior art solvent extraction processes a method for eliminating the need for discarding cobalt enriched organic extractant from the process in order to prevent "cobalt poisoning" of the extractant and to thereby avoid the waste disposal problem associated with discarding the extractant, and the loss of valuable cobalt and extractant.

It is another object of this invention to provide in such prior art solvent extraction processes a method for recovering, for recycle to the process, the ammonia and cobalt transferred to the extractant during the extraction step.

These and other objects of the invention will be apparent to those skilled in the art from a consideration of this entire disclosure.

SUMMARY OF THE INVENTION

The above objectives are accomplished in accordance with the present invention by washing the nickel-loaded organic extractant, prior to subjecting it to the sulfuric acid stripping operation, with water and an aqueous carbon dioxide solution in order to remove from the extractant substantially all the ammonia transferred to it from the ammoniacal leach solution during the extraction step. This washing step produces an aqueous ammoniacal solution containing the recovered ammonia which can then be recycled to prepare additional leaching solution so that the ammonia is not lost to the process. Since the nickel-loaded extractant is substantially free of ammonia when it is subsequently stripped with aqueous sulfuric acid, there is insufficient ammonia present to react with the sulfuric acid to rob it of its stripping power and cause a loss of sulfuric acid to the process. For the same reason, undesirable compounds such as $(NH_4)_2SO_4$ and $(NiNH_4)_2(SO_4)_3$ are not formed in the stripped aqueous product solution so that the nickel in the solution can be electrolytically recovered in high purity. The absence of these undesirable compounds also avoids further consumption of the sulfuric acid stripping agent.

After the nickel has been stripped from the organic extract, the extract still contains some cobalt which can be removed by stripping the extract again with aqueous acid, but this time at a much higher temperature, e.g. 170° to 300°F., than the previous stripping step to remove the nickel, which usually occurs at temperatures of about 50° to 130°F. This high temperature stripping step removes substantially all the cobalt and permits the extractant to be recycled to the process since there is no longer enough cobalt present in it to interfere with the extraction of the nickel from the ammoniacal solution. Since the nickel extraction can operate efficiently as long as the cobalt content in the organic extractant is less than about 2 grams per liter, it may not be necessary to subject all of the organic extract to the high temperature sulfuric acid stripping of the invention. In some cases, it suffices to treat only a fraction of the nickel-depleted extract as long as the composite extractant returned to the process has a cobalt concentration less than about 2 grams per liter. By this technique, losses of organic extractant and cobalt are reduced as is the problem of disposing of the cobalt enriched extractant which previously had to be discarded from the process. The cobalt removal aspect of the invention is, of course, an improvement of the prior art solvent extraction processes which is generally applicable regardless of the nature of the stripping agent used.

BRIEF DESCRIPTION OF THE DRAWING

The drawing is a flowsheet showing a prior art process for solvent extracting nickel from an ammoniacal solution, and the improvement of this invention which advantageously removes and recovers ammonia and cobalt from the organic extractant used in the process. The dotted lines generally represent the prior art process and the solid lines the improvement of the present invention.

DESCRIPTION OF THE PREFERRED EMBODIMENTS

Referring to the drawing, the feed leach solution 1 is an aqueous alkaline ammoniacal carbonate solution illustratively containing about 70 grams per liter of total ammonia, expressed as $NH_3$, about 20 grams per liter of free ammonia ($NH_4OH$), expressed as $NH_3$, about 4 to 20 grams per liter of nickel, and about 0.05 to 2 grams per liter of cobalt. The pH of the solution is normally above 7, and preferably above 8. The nickel content is preferably about 10 grams per liter and the cobalt content preferably about 0.5 grams per liter. The ammoniacal carbonate solutions which may serve as feed leach solutions are not limited to those produced by the high temperature reduction and atmospheric leaching previously described. Illustrative ammoniacal carbonate solutions which are also suitable include, for example, those produced by the pressure leaching of cobalt-containing nickeliferous ores with ammonium hydroxide-ammonium carbonate solutions at relatively low temperatures, those produced by the redissolution of basic nickel and cobalt carbonates into ammonium hydroxide-ammonium carbonate solutions, those produced by the redissolution of mixed nickel and cobalt sulfides into ammonium hydroxide-ammonium carbonate solutions, and the like. Such solutions are often encountered at different stages of the various processes for the recovery of nickel and cobalt from nickeliferous ores by hydrometallurgical techniques.

The feed leach solution 1 may also be a nickel and cobalt-enriched ammoniacal chloride solution, ammoniacal nitrate solution or ammoniacal sulfate solution of the types previously described, having a pH above 7, and preferably above 8.

Ammonical chloride solutions prepared by leaching lateritic ores with an aqueous ammonium hydroxide-ammonium chloride leach liquor have the following illustrative compositions:

|  | grams per liter |
|---|---|
| free ammonia | 10–40 |
| total ammonia | 50–100 |
| chloride, as Cl | 30–90 |
| nickel | 5–20 |
| cobalt | 0.2–2 | while those prepared by the dissolution or redissolution technique described above have the following illustrative compositions:

|  | grams per liter |
|---|---|
| free ammonia | 10–170 |
| total ammonia | 10–200 |
| chloride, as Cl | 0.3–40 |
| nickel | 0.2–100 |
| cobalt | 0.2–100 |

Ammoniacal nitrate solutions prepared by leaching reduced lateritic ores with an aqueous ammonium hydroxide-ammonium nitrate leach liquor have the following illustrative compositions:

|  | grams per liter |
|---|---|
| free ammonia | 10–40 |
| total ammonia | 50–100 |
| nitrate, as NO$_3$ | 60–150 |
| nickel | 5–20 |
| cobalt | 0.2–2 | while those prepared by the dissolution or redissolution technique described above have the following illustrative compositions:

|  | grams per liter |
|---|---|
| free ammonia | 10–170 |
| total ammonia | 10–200 |
| nitrate, as NO$_3$ | 0.6–70 |
| nickel | 0.2–100 |
| cobalt | 0.2–100 |

Ammoniacal sulfate solutions prepared by leaching reduced lateritic ores with an aqueous ammonium hydroxide-ammonium sulfate leach liquor have the following illustrative compositions:

|  | grams per liter |
|---|---|
| free ammonia | 10–40 |
| total ammonia | 50–100 |
| sulfate, as SO$_4$ | 100–240 |
| nickel | 5–20 |
| cobalt | 0.2–2 | while those prepared by the dissolution or redissolution technique described above have the following illustrative compositions:

|  | grams per liter |
|---|---|
| free ammonia | 10–170 |
| total ammonia | 10–200 |
| sulfate, as SO$_4$ | 10–100 |
| nickel | 0.2–100 |
| cobalt | 0.2–100 |

Preferred feed leach solutions are the ammoniacal carbonate solutions in general, and ammoniacal sulfate solutions produced by the redissolution of a mixture of nickel sulfide and cobalt sulfide in an aqueous solution of ammonium hydroxide and ammonium sulfate or in aqueous sulfuric acid followed by adjustment of the pH to above 8 with ammonia.

In most cases, oxidation of the feed leach solution 1 is not required prior to its extraction with the organic extractant and the solution can be fed directly to the extraction stages of the process without significantly affecting the degree of selectivity of the extraction operation with respect to the nickel-cobalt separation. There may be cases, however, as known in the art, where an initial oxidation of the feed leach solution prior to extraction is desirable in order to obtain, for example, a better nickel extraction, or a better cobalt rejection, or a more efficient extraction operation, etc. In these cases the oxidation of the feed leach solution may be carried out by injecting a gas containing elemental oxygen such as air, or any other suitable oxidizing agent, into the leach solution in a manner similar to that described in U.S. Pat. No. 3,276,863.

The extraction itself is carried out by contacting the feed leach solution 1 with an organic extractant 2 in any type of equipment normally used for an extraction operation and separating the two phases by virtue of their mutual immiscibility. As shown in the drawing, organic extractant 2 is recycled material. The organic extractant 2 comprises a water immiscible organic diluent and one or more compounds selected from the following groups:

a. Oximes represented by the formula:

(I)

wherein R$_1$ is selected from the group consisting of:

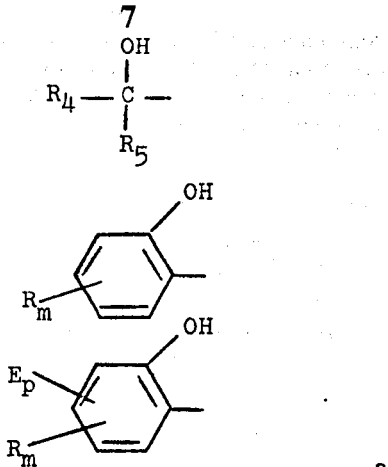

, and and wherein $R_2$ is selected from the group consisting of:

provided that if $R_1$ is cyclic, $R_2$ must also be cyclic, wherein:

$R_4$ and $R_6$ are each an alkyl group containing 1 to 14 carbon atoms;

$R_5$ is selected from the group consisting of hydrogen and alkyl groups provided that any compound in which the $R_4$ and $R_5$ group each appears contains 8 to 40 carbon atoms;

R and R' are each selected from the group consisting of aliphatic, ethylenically unsaturated aliphatic and saturated or ethylenically unsaturated ether groups (i.e. —OR''), provided that any compound in which the R and R' group each appears contains 3 to 25 carbon atoms in the R and R' groups, the R' group containing 1 to 25 carbon atoms when saturated and 3 to 25 carbon atoms when ethylenically unsaturated;

E is selected from the group consisting of an inorganic or organic electron withdrawing substituent such as —NO₂, Cl—, —CN, —SF₅ and SO₂R₇, where R₇ is an organic radical such as an alkyl radical containing 1 to 8 carbon atoms;

p is 1, 2, 3, or 4; and m and n are each 0, 1, 2, 3, or 4 except where the oxime contains an E substituent in which case m is 0 or a whole integer up to 4—p; and b. Oxines represented by the formula:

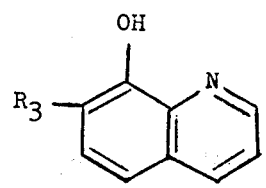

(II)

wherein $R_3$ is selected from the group consisting of saturated aliphatic groups and ethylenically unsaturated aliphatic groups containing 1 to 25 carbon atoms when saturated aliphatic and 3 to 25 carbon atoms when ethylenically unsaturated.

The above oxime and oxine compounds are known to those skilled in the art and have been previously described in several patents. For example, among the oximes represented by the Formula (I) compounds above, the aliphatic α-hydroxy oximes represented by the formula:

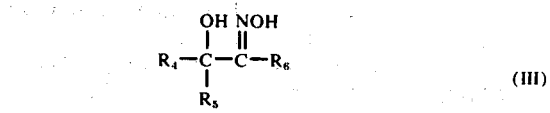

(III)

are described in detail in U.S. Pat. No. 3,276,863 whose disclosure is incorporated herein by reference. An illustrative compound is 5,8-diethyl-7-hydroxydecane-6-oxime. The 2-hydroxybenzophenoximes included among the Formula (I) compounds, which are represented by the formula:

(IV)

are described in detail in U.S. Pat. No. 3,592,775 whose disclosure is incorporated herein by reference. An illustrative compound is 2-hydroxy-2',4',5'-trimethyl-5-octylbenzophenoxime. The substituted 2-hydroxybenzophenoximes included among the Formula (I) compounds, which are represented by the formula:

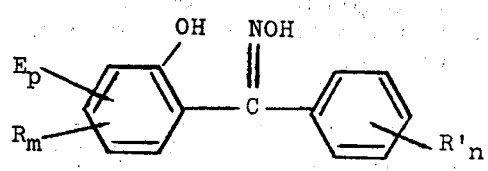

(V)

are described in detail in U.S. Pat. No. 3,665,347 whose disclosure is incorporated herein by reference. An illustrative compound is 2-hydroxy-3-methyl-5-nitro-4'-dodecylbenzophenoxime.

Substituted oxines embraced by the Formula (II) compounds above are described in detail in U.S. Pat. No. 3,725,046 whose disclosure is incorporated herein by reference. Examples of illustrative $R_3$ groups of the Formula (II) compounds are further disclosed in U.S. Pat. Nos. 3,592,775 and 3,665,347 (whose R' group is defined similarly to the $R_3$ group of the Formula (II) compounds). An illustrative compound is 5-dodecyl-8-hydroxyquinoline.

Reference is made to U.S. Pat. Nos. 3,276,863, 3,592,775, 3,665,347 and 3,725,046 to show that the details of the compounds represented by Formulae (I) and (II) above, and the methods for their preparation, are well known to those skilled in the art and consequently need not be repeated herein.

Illustrative organic diluents for use in the extractant 2 include such substantially water immiscible materials as toluene, benzene, kerosene, fuel oil, and other aliphatic and aromatic liquid hydrocarbons. Special additives which improve the solubility of the oximes and oxines in the organic diluent may be used if desired. Certain long chain aliphatic alcohols such as decanol, tridecyl alcohol, and the like are known to be suitable for this purpose, as disclosed in certain of the patents mentioned above. However, the use of these additives in the extraction is optional.

The concentration of oxime, or oxine in the extractant, the volumetric ratio of the organic phase to the aqueous phase, the number of extraction stages, and other design considerations are known to those skilled in the art. Normally, the organic extractant 2 contains between about 5 and 50% by volume of the oxime or oxine compound. Organic-to-aqueous volumetric flow rate ratios which have been found to be effective are from 1 to 5, and the number of extraction stages most frequently used is from 1 to 5.

As explained above, the cobalt content of the organic extractant 2 cannot become excessively high otherwise it will interfere with the efficient selective extraction of the nickel from the feed leach solution if recycled to the process. In general, it has been found that satisfactory nickel extraction is obtained if the cobalt content of the organic extractant 2 is less than about 2, and preferably less than about 1, grams per liter. Appreciable amounts of cobalt normally build up in the organic extractant 2 if the extractant is continuously reused in the process without some sort of a cobalt purge.

The raffinate 4 from the extraction step contains most of the cobalt present in the feed solution 1 and virtually no nickel, while the organic extract 3 contains most of the nickel and small amounts of cobalt and ammonia from the feed solution. The raffinate 4 is sent to cobalt recovery operations where it is recovered by known procedures. The organic extract 3 is further processed to recover its nickel content.

A small amount of the ammonia and cobalt in the feed solution 1 transfers to the organic extract 3 along with the bulk of the nickel. For example, the extract 3 illustratively contains about 1 to 10, and more often about 2 to 5, grams of ammonia per liter and about 0.1 to 2 grams of cobalt per liter. It is not unusual for as much as 3% of the cobalt originally present in the leach liquor to transfer into the organic extract. In prior art processes, this means that after a few passes in the circuit, the cobalt levels in the extract will tend to build up considerably unless extractant is bled from the process. As discussed above, this problem is overcome in the present invention by removing this cobalt from the organic extractant so that the extractant can be continuously reused in the process.

From the extraction operation, the nickel-pregnant organic extract 3 goes to the washing operation where it is contacted with water 5 and then with an aqueous solution of carbon dioxide 6 in order to strip the ammonia present in the extract. The concentration of dissolved carbon dioxide in the aqueous carbon dioxide wash solution 6 is illustratively between about 0.01% by weight and saturation (about 0.1%), and preferably close to saturation. The organic-to-aqueous flow rate ratio in both the water wash stages and the aqueous carbon dioxide stages is about 1 to 5, and preferably about 1.5 to 4. The number of stages used is illustratively between 1 to 5, and preferably between 2 to 4. Extraction equipment of the mixer-settler type is preferred for the washing operation.

The high level of ammonia in the extract 3 before the washing operation is undesirable if the extract is to be stripped with a sulfuric acid solution to produce a good electrolytic solution for the recovery of metallic nickel. It is preferred that the ammonia level of the nickel-pregnant extract fed to the stripping circuit remain so low as to be undetectable, with a maximum tolerable level of about 0.05 grams of $NH_3$ per liter. The ammonia level of the ammonia-free extract 8 from the washing operation of this invention is normally less than 0.001 grams of $NH_3$ per liter, and preferably so low as to be undetected. The washing step effectively strips substantially all the ammonia associated with the extract 3 and carries it, as an aqueous ammonium carbonate solution 7, to the leaching stages of the process where it is used to make up the leach liquor. During the washing, the nickel and cobalt contents of the extract 3 remain virtually unchanged.

The washed nickel-loaded, ammonia-free extract 8 is then first stripped of its nickel at low temperatures with aqueous sulfuric acid and then stripped of its cobalt at high temperatures with aqueous sulfuric acid. The cobalt values are not stripped in the low temperature operation but are stripped in the high temperature operation. The low temperatures of the nickel stripping operation are normally ambient, e.g., between about 50° and 130° F., and preferably between about 60° and 100° F. The high temperatures of the cobalt stripping operation are illustratively between about 170° and 300° F., and preferably between 210° and 250° F.

The strip solution 9 used in the low temperature stripping operation consists of an aqueous sulfuric acid solution illustratively containing between about 0.5 and 20% by weight $H_2SO_4$, and preferably between about 1 and 5% by weight $H_2SO_4$. The resulting nickel sulfate solution 10 from the low temperature stripping operation contains virtually all the nickel present in the ammonia-free extract from the washing operation, and is normally an excellent feed for an electrolytic deposition operation for the recovery of very pure metallic nickel. Means for recovering the nickel values from the product strip solution are known to those skilled in the art. For example, if nickel sulfate is the desired end product, the product strip solution 10 may be sent to a crystallizer to deposit nickel sulfate crystals. If metallic nickel 11 is the desired end product (see the drawing), the strip solution 10 containing the nickel sulfate may be sent to an electrolytic deposition operation. In the latter case, sulfuric acid 9 is also produced in the electrolytic cells which can be recycled to the stripping stages. The recycled solution 9 then strips more nickel values from the extract 8 during the low temperature treatment and deposits them in the cells. The equipment used in the low temperature stripping operation is preferably of the mixer-settler type.

The nickel-stripped organic extract 12 leaving the low temperature stripping step normally contains between about 0.1 and 2 grams per liter of cobalt, depending on how many times it has passed through the process circuit. All of the stripped extract, or at least a portion thereof, is then fed to the high temperature stripping operation. The fraction of the nickel-stripped extract 12 which is treated by the high temperature stripping operation will depend on various process considerations. In a commercial operation, it normally would not be feasible to subject all of the stripped extract to high temperature stripping. A more practical route is to treat only a fraction 12a of the nickel-stripped extract 12 in the high temperature stripping operation and combine the treated fraction 12a with the untreated fraction 12b and a make-up stream 14 to produce a recycled extractant 2 sufficiently low in cobalt content to be suitable for the efficient extraction of nickel from the feed leach solution 1. The amount of cobalt that would have to be removed in the high temperature treatment and the magnitude of the fraction 12a of the stripped organic stream to be treated depend on such illustrative factors as the amount of cobalt present in the extract 12, the efficiency of the stripping operation, and other process considerations. In any case, when the process of this invention is applied, the need to bleed the cobalt-poisoned organic with the accompanying loss of expensive extractant, pollution hazard, and disposal problem is eliminated. At the same time, a small amount of cobalt which otherwise would be lost is recovered in stream 15 and, in addition, the efficiency of the low temperature nickel stripping operation is improved.

Illustratively anywhere from about 0.1 to 100% of extract 12 can be subjected to the high temperature stripping. In a preferred embodiment, only a fraction 12a of the extract 12 is fed to the high temperature operation while the rest 12b bypasses it. Illustratively this fraction 12a comprises about 0.1 to 10% of extract 12. Aqueous sulfuric acid 13 is used to strip the cobalt values from the extract 12 at this point. The type of equipment used in the high temperature operation is preferably chosen so that the required temperatures of 170° to 300° F. can be maintained during the contacting of the extract and the sulfuric acid solution. Examples of equipment that is effective for this operation are mixer-settlers in which mixing compartments are completely enclosed and operated at elevated pressures and temperatures, and mixer-settlers in which the mixing compartments are operated at atmospheric pressures but are provided with a reflux condenser in order to prevent the boiling off of any of the components in the mixers. Normally, between 1 and 5 stages of the mixer-settler configuration are adequate. The concentration of the $H_2SO_4$ in the aqueous solution 13 should be between about 1 and 30% by weight, and preferably between about 2 and 20% by weight. The aqueous-to-organic ratio of the high temperature stripping operation is illustratively between 1 and 5, and preferably between 2 and 4.

Make-up extractant 14 is blended with the cobalt depleted stripped extractant 16 as needed to compensate for losses due to spillage, entrainment, etc., as shown in the accompanying drawing.

The organic extractant 2 recycled to the initial extraction stages of the process illustratively contains less than about 2 grams per liter of cobalt, and preferably less than about 1 gram per liter. The amount of cobalt removed by the high temperature stripping is thus enough to maintain a level of less than about 2 grams per liter of cobalt in the recycled organic after the cobalt-free organic stream 12a from the high temperature treatment is combined with the untreated stream 12b and the make-up organic stream 14.

The following example is provided to further illustrate the invention.

EXAMPLE

The flowscheme illustrated in the accompanying drawing was operated continuously for 24 hours. The feed leach solution 1 had a total ammonia content of 70 grams per liter, expressed as $NH_3$, a free ammonia ($NH_4OH$) content of 20 grams per liter, expressed as $NH_3$, a nickel content of 10 grams per liter, a cobalt content of 0.45 grams per liter, and a pH of about 10. This solution was a sample of a product liquor produced by the ammoniacal leaching of reduced nickeliferous ores, in the presence of oxygen, with an ammonium carbonate-ammonium hydroxide leach solution. The solution was fed directly to two extraction stages of the mixer-settler type and countercurrently extracted with a 25% by volume recycled solution 2 of LIX-64N in Napoleum 470. LIX-64N is the trade name of an aliphatic α-hydroxy oxime (of the type described in U.S. Pat. No. 2,276,863) manufactured by General Mills Corporation and known to be effective in the extraction of nickel from ammoniacal solutions. Napoleum 470 is the trade name of an aliphatic hydrocarbon diluent manufactured by Kerr-McGee Corporation and known to be suitable for carrying the organic extractant used here. The organic-to-aqueous ratio in the extraction operation was 2.5. After 24 hours the raffinate 4 of the extraction operation contained about 0.44 grams per liter of cobalt and 0.1 grams per liter of nickel, indicating that nearly all of the cobalt remained with the aqueous phase. Normally, this raffinate would be sent to cobalt recovery operations where the cobalt would be separated by methods known in the art. The organic extract 3 of the extraction operation contained 1 gram per liter of cobalt and 4.36 grams per liter of nickel, indicating a nickel extraction in the order of about 99%. The extract also contained about 1.5 grams per liter of $NH_3$. The organic extract was first washed with water 5 in a two-stage mixer-settler circuit using an organic-to-aqueous volume ratio of 5. After the two water stages, the organic stream contained 0.15 grams per liter of $NH_3$. It was then washed in one mixer-settler stage with a saturated solution of carbon dioxide in water 6. The aqueous ammonium carbonate solution 6 formed in the washing operation contained virtually all of the ammonia in with the extract before the washing step and, normally, would be returned to the leaching stages of the process to make up the leach liquor. The level of ammonia in the washed extract was too low to measure, indicating a removal of substantially 100% of the ammonia.

The ammonia-free extract 8 was stripped with an aqueous strip solution 9 containing 24 grams per liter H₂SO₄ and 50 grams per liter nickel. Three stages were used and the organic-to-aqueous ratio was 2. The equipment used was of the mixer-settler type and the temperature of the stripping step was 80° F. The product strip solution 10 contained about 58 grams per liter nickel. About 91% of the nickel was removed from the extract 8 by the low temperature stripping. The cobalt level of the product strip solution 10 was insignificant. Virtually all of the cobalt present in the washed extract 8 remained in the nickel-stripped extract 12.

About 0.1% of the nickel-free organic extract 12 was sent to the high temperature stripping operation where its cobalt content was reduced to 0.1 grams per liter. Treatment of such a small portion of the extract 12 was possible since the build-up of cobalt in the extract is normally quite small on each pass of the extractant through the process although it can rise to higher portions with repeated passes through the process without an intervening purge of cobalt. In the present example, this purge takes place on each pass through the process by virtue of the high temperature stripping. However, were the high temperature stripping applied only on every tenth or twentieth pass, for example, more than 0.1% of the extract 12 would normally require the high temperature stripping treatment.

An aqueous sulfuric acid solution 13 at about 220° F. was used to strip the extract 12a in one stage of the mixer-settler type. The mixer was equipped with an externally cooled reflux condenser and the organic-to-aqueous ratio was 5. The concentration of sulfuric acid in the high temperature strip solution was 15% by weight H₂SO₄. The aqueous CoSO₄ solution 15 from the high temperature stripping contained the recovered cobalt values and, normally, would be sent to cobalt recovery operations. The high temperature treatment recovered 90% of the cobalt present in the stripped organic. The cobalt-stripped extractant 16 was combined with the untreated fraction 12b of the nickel-stripped organic and returned to the initial extraction stages of the process for reuse in extracting the feed leach solution.

The specific and detailed information presented in the above example and elsewhere in this disclosure are illustrative only and such alterations and modifications thereof as would be apparent to one skilled in the art are deemed to fall within the scope and spirit of the invention, bearing in mind that the invention is defined only by the following claims.

What is claimed is:

1. In a method for selectively recovering nickel from an aqueous ammoniacal solution containing nickel and cobalt wherein the solution is treated with an extractant comprising a substantially water immiscible organic liquid and an oxime or oxine compound capable of selectively extracting nickel into the extractant, to thereby extract substantially all the nickel into the extractant and a minor amount of the cobalt and ammonia present in the ammoniacal solution, and wherein the nickel is recovered from the extractant by stripping it at substantially ambient temperatures with an aqueous solution capable of withdrawing the nickel from the extractant into the aqueous solution:

the improvement for removing the cobalt from the extractant which comprises stripping at least a portion of the extractant with aqueous sulfuric acid at temperatures of about 170° to 300°F., after the extractant has been stripped with aqueous solution at substantially ambient temperatures to remove nickel from the extractant, to thereby remove from the extractant sufficient cobalt to permit recycle of the extractant to the extraction step of the process.

2. The method of claim 1 wherein about 0.1 to 10% by volume of the extractant is subjected to the high temperature stripping step.

3. The method of claim 2 wherein the extractant subjected to stripping at 170° to 300° F. is combined with extractant not subjected to stripping at 170° to 300° F. to form a composite for recycle to the extraction step of the process, and wherein the stripping at 170° to 300° F. removes sufficient cobalt from the extractant that said composite contains less than about 2 grams of cobalt per liter.

4. The method of claim 2 wherein the extractant subjected to the 170° to 300° F. stripping is combined with the extractant not subjected to stripping at 170° to 300° F. to form a composite for recycle to the extraction step of the process, and wherein the stripping at 170° to 300° F. removes sufficient cobalt from the extractant that said composite contains less than about 1 gram of cobalt per liter.

5. The method of claim 1 wherein the high temperature stripping is carried out at a temperature of about 210° to 250° F.

6. The method of claim 1 wherein the aqueous ammoniacal solution is an ammoniacal carbonate solution or an ammoniacal sulfate solution.

7. The method of claim 1 wherein the aqueous sulfuric acid strips substantially all the cobalt from the extractant.

8. The method of claim 1 wherein the aqueous sulfuric acid strips at least about 90% of the cobalt from the extractant.

9. The method of claim 1 wherein the aqueous sulfuric acid removes sufficient cobalt from the extractant to cause the extractant recycled to the extraction step of the process to contain less than about 2 grams of cobalt per liter.

10. The method of claim 1 wherein the aqueous sulfuric acid removes sufficient cobalt from the extractant to cause the extractant recycled to the extraction step of the process to contain less than about 1 gram of cobalt per liter.

11. The method of claim 1 wherein the aqueous sulfuric acid comprises 1 to 30% by weight H₂SO₄.

12. The method of claim 11 wherein the aqueous sulfuric acid comprises 2 to 20% by weight H₂SO₄.

13. The method of claim 11 wherein the aqueous-to-organic ratio for extracting cobalt is 1 to 5.

14. The method of claim 13 wherein the aqueous-to-organic ratio is 2 to 4.

15. In a method for selectively recovering nickel from an aqueous ammoniacal solution containing nickel and cobalt wherein the solution is treated with an extractant comprising a substantially water immiscible organic liquid and an oxime or oxine compound capable of selectively extracting nickel into the extractant, to thereby extract substantially all the nickel into the extractant and a minor amount of the cobalt present in the ammoniacal solution, and wherein the nickel is recovered from the extractant by stripping it at substantially ambient temperatures with an aqueous solution capable of withdrawing the nickel from the extractant into the aqueous solution:

the improvement for removing the cobalt from the extractant which comprises stripping only a portion of the extractant with aqueous sulfuric acid at temperatures of about 210° to 250° F., after the extractant has been stripped with aqueous solution at substantially ambient temperatures to remove nickel from the extractant, to thereby remove cobalt from said portion of extractant, combining said portion with the extractant not subjected to stripping at 210° to 250° F. to form a composite, and recycling the composite to the extraction step of the process, and wherein said stripping at 210° to 250° F. removes sufficient cobalt from said portion of extractant to produce a cobalt concentration in said composite recycled to the extraction step of the process of less than about 2 grams per liter.

16. The method of claim 15 wherein the composite contains less than about 1 gram of cobalt per liter, and wherein said portion of extractant stripped at 210° to 250° F. represents about 0.1 to 10% of the volume of total extractant.

17. The method of claim 15 wherein said stripping at 210° to 250° F. removes substantially all the cobalt from said portion.

18. The method of claim 15 wherein said stripping at 210° to 250° F. removes at least about 90% of the cobalt from said portion.

19. The method of claim 15 wherein the aqueous sulfuric acid comprises 1 to 30% by weight $H_2SO_4$.

20. The method of claim 19 wherein the aqueous sulfuric acid comprises 2 to 20% by weight $H_2SO_4$.

21. The method of claim 19 wherein the aqueous-to-organic ratio for extracting cobalt is 1 to 5.

22. The method of claim 21 wherein the aqueous-to-organic ratio is 2 to 4.

* * * * *